(12) United States Patent
 Jolly

(10) Patent No.: US 10,502,405 B2
(45) Date of Patent: Dec. 10, 2019

(54) ELECTRICALLY CONDUCTING SANDWICH PANEL

(71) Applicant: PIXLUM, Soullans (FR)

(72) Inventor: Philippe Jolly, Soullans (FR)

(73) Assignee: PIXLUM, Soullans (FR)

( * ) Notice: Subject to any disclaimer, the term of this patent is extended or adjusted under 35 U.S.C. 154(b) by 72 days.

(21) Appl. No.: 15/574,725

(22) PCT Filed: May 20, 2016

(86) PCT No.: PCT/FR2016/051199
§ 371 (c)(1),
(2) Date: Nov. 16, 2017

(87) PCT Pub. No.: WO2016/189236
PCT Pub. Date: Dec. 1, 2016

(65) Prior Publication Data
US 2018/0135844 A1    May 17, 2018

(30) Foreign Application Priority Data

May 22, 2015 (FR) ..................................... 15 54618

(51) Int. Cl.
*F21V 23/06* (2006.01)
*B32B 3/26* (2006.01)
(Continued)

(52) U.S. Cl.
CPC ............... *F21V 23/06* (2013.01); *B32B 3/08* (2013.01); *B32B 3/266* (2013.01); *B32B 5/02* (2013.01); *B32B 5/18* (2013.01); *B32B 7/02* (2013.01); *B32B 7/08* (2013.01); *B32B 7/14* (2013.01); *B32B 13/08* (2013.01); *B32B 15/046* (2013.01); *B32B 15/10* (2013.01); *B32B 15/14* (2013.01); *B32B 15/20* (2013.01); *B32B 21/02* (2013.01);
(Continued)

(58) Field of Classification Search
None
See application file for complete search history.

(56) References Cited

U.S. PATENT DOCUMENTS

2007/0091620 A1    4/2007  Matheson
2016/0057854 A1*   2/2016  Schneider ............... B32B 9/007
                                                         174/252

FOREIGN PATENT DOCUMENTS

DE    202004011454    9/2004
DE    102012013831    1/2014
WO    2004063484      7/2004

OTHER PUBLICATIONS

Search Report dated Mar. 9, 2016.
Search Report dated Aug. 29, 2016.

* cited by examiner

*Primary Examiner* — Sharon E Payne
(74) *Attorney, Agent, or Firm* — Ipsilon USA, LLP

(57) ABSTRACT

An electrically conductive sandwich panel (10) supplies at least one electrical device to be pushed into the panel. The sandwich panel (10) has two electrically conductive layers (13, 15) insulated from each other and a layer (11) formed by a board (12, 14) insulated from said electrical layers. The board has two sheets (111, 112) of cardboard enclosing an electrically insulating material, such as plaster. Connectors are used to connect the electrically conductive layers to a power supply. The panel may be screw-fastened on a support by means of suitable screws and may be fitted with a suitable electrical device. A punch tool facilitates pushing the electrical device into the panel.

16 Claims, 4 Drawing Sheets

(51) Int. Cl.
*B23B 3/08* (2006.01)
*B32B 21/06* (2006.01)
*F21V 19/00* (2006.01)
*B32B 37/12* (2006.01)
*E04C 2/284* (2006.01)
*E04C 2/292* (2006.01)
*B32B 13/08* (2006.01)
*B32B 33/00* (2006.01)
*E04C 2/04* (2006.01)
*F21V 21/002* (2006.01)
*E04C 2/26* (2006.01)
*B32B 5/02* (2006.01)
*B32B 5/18* (2006.01)
*B32B 7/02* (2019.01)
*B32B 7/08* (2019.01)
*B32B 7/14* (2006.01)
*B32B 15/04* (2006.01)
*B32B 15/10* (2006.01)
*B32B 15/14* (2006.01)
*B32B 15/20* (2006.01)
*B32B 21/02* (2006.01)
*B32B 29/00* (2006.01)
*B32B 29/02* (2006.01)
*B32B 3/08* (2006.01)
*F21Y 115/10* (2016.01)

(52) U.S. Cl.
CPC ............ *B32B 21/06* (2013.01); *B32B 29/007* (2013.01); *B32B 29/02* (2013.01); *B32B 33/00* (2013.01); *B32B 37/1292* (2013.01); *E04C 2/043* (2013.01); *E04C 2/26* (2013.01); *E04C 2/284* (2013.01); *E04C 2/292* (2013.01); *F21V 19/0025* (2013.01); *F21V 21/002* (2013.01); *B32B 2250/05* (2013.01); *B32B 2250/40* (2013.01); *B32B 2262/067* (2013.01); *B32B 2262/101* (2013.01); *B32B 2262/108* (2013.01); *B32B 2266/02* (2013.01); *B32B 2266/0228* (2013.01); *B32B 2266/0278* (2013.01); *B32B 2307/202* (2013.01); *B32B 2307/206* (2013.01); *B32B 2307/72* (2013.01); *B32B 2307/732* (2013.01); *B32B 2311/24* (2013.01); *B32B 2315/18* (2013.01); *B32B 2457/00* (2013.01); *B32B 2607/00* (2013.01); *F21Y 2115/10* (2016.08)

ELECTRICALLY CONDUCTING SANDWICH PANEL

RELATED APPLICATION

This application is a National Phase of PCT/FR2016/051199, filed on May 20, 2016 which in turn claims the benefit of priority from French Patent Application No. 15 54618, filed on May 22, 2015, the entirety of which are incorporated by reference.

FIELD OF THE INVENTION

In general manner, the present invention relates to electrically conductive sandwich panels that are designed to have electrical devices electrically connected thereto.

PRIOR ART

Electrically conductive sandwich panels are known in the prior art that comprise a first layer of polyurethane foam, a second layer of metal, a third layer of polyurethane foam, a fourth layer of metal, and a fifth layer of polyurethane foam. Said metal layers form power supply tracks into which the pins of a light-emitting diode (LED) lighting device may be pushed in order to enable said LED lighting devices to be powered.

Said panel may be fastened on a support on a wall or a ceiling. The polyurethane foam first layer, which faces the inside of the room, is designed to be coated. However, the Applicant has observed that the panels are fragile and that workers generally do not know how to work on said first layer in order to coat it. Furthermore, the fire protection provided by such a panel is poor.

Initially, the Applicant thus attempted replacing the polyurethane foam first layer of the panel with plasterboard. However, after pushing the pins of LED devices through the panel, the applicant observed that the LED devices did not function, despite the fact that the metal layers of the panel were indeed powered.

Document WO2007/006147 A1 describes modular panel lighting apparatus comprising a multi-layer power board and one or more lighting modules.

An object of the present invention is to propose a novel panel making it possible to overcome all or some of the above-described problems.

In particular, an object of the invention is to provide a panel that is strong, having an exposed face that is easy to work on, providing better fire protection, and for which the risk of malfunction of the electrical devices pushed into the panel is reduced.

SUMMARY OF THE INVENTION

To this end, the invention provides an electrically conductive sandwich panel, characterized in that said sandwich panel comprises in the following order:
  a first layer formed of a board that comprises two sheets of cardboard enclosing an electrically insulating material, such as plaster;
  a second layer of electrically insulating material;
  a third layer of electrically conductive material;
  a fourth layer of electrically insulating material;
  a fifth layer of electrically conductive material; and
  a sixth layer of electrically insulating material.

When pushing a pin of an electrical device into the panel, the presence of the second layer of electrically insulating material between the board and the power supply track formed by the third layer of electrically conductive material, makes it possible for the second sheet of cardboard of the board to deform conically against said second layer, while the second layer allows the pin to pass through without being interposed between the pin and the power supply track while the pin is being pushed in.

In contrast, in the solution attempted by the Applicant in which the panel was formed by a board applied directly against a power supply track, itself formed by a metal layer, pushing the pin into the panel gave rise to conical deformation of the second sheet of cardboard interposed between the power supply track and the pin. Thus, the pin did not make sufficient electrical contact with the power supply track because it was insulated from the track, at least in part, by the deformed sheet of cardboard. Although in the above-described solution attempted by the Applicant said board was plasterboard, it has been observed that the same electrical contact problem exists with any other board that comprises two sheets of cardboard enclosing an electrically insulating material, when said board is applied directly against a power supply track formed by a metal layer.

The presence of the second layer of electrically insulating material that is different from a sheet of cardboard, makes it possible for the second sheet of cardboard, even when in the conically deformed state, to be kept at a distance from the power supply track formed by the third layer of electrically conductive material.

According to an advantageous characteristic of the invention, the second and third layers, as well as the fourth and fifth layers, are bonded together adhesively by depositing lines of adhesive with a regular quantity of adhesive along each line.

In particular, the adhesive is deposited in the form of beads of diameter that is less than the diameter of the or each pin of the device pushed into the panel.

According to an advantageous characteristic of the invention, the second layer presents a thickness that is less than the thickness of the fourth and sixth layers.

According to an advantageous characteristic of the invention, at least one of the electrically conductive layers, and preferably each of them, comprises two metal sheets, preferably made of aluminum, and a sheet of elastic material enclosed between said metal sheets.

According to an advantageous characteristic of the invention, said sandwich panel is further fitted with at least one electrical device, preferably a lighting device, e.g. an LED lighting device, which has one or two connection pins designed to be pushed into the panel and carrying two electrical contacts, the two electrical contacts being distributed on the or each of said pins in such a manner that, when the pin(s) is/are pushed into the panel, one of the electrical contacts touches one of the electrically conductive layers, without touching the other electrically conductive layer, which is touched by the other electrical contact.

In a particular aspect, the second layer of electrically insulating material is of thickness that is at least equal to the diameter of the or each pin of the electrical device pushed into the panel.

The invention also relates to an electrical device, preferably a lighting device, e.g. an LED lighting device, which has one or two connection pins designed to be pushed into an electrically conductive sandwich panel and carrying two electrical contacts, the two electrical contacts being distributed on the or each of said pins in such a manner that, when the pin(s) is/are pushed into the panel, one of the electrical contacts touches one of the electrically conductive layers, without touching the other electrically conductive layer, which is touched by the other electrical contact.

According to an advantageous characteristic of the invention, said sandwich panel is further fitted with two connectors, one of the connectors being suitable for connecting one of the electrically conductive layers to one terminal of a power supply, and the other connector being suitable for connecting the other electrically conductive layer to the other terminal of the power supply. Each connector presents a U-shape, the free end of each branch being pointed and each branch of the U-shape being slotted longitudinally from its free end to the connection zone between said branch and the end wall of the U-shape.

According to an advantageous characteristic of the invention, each branch of the connector is pushed into an edge face of the sandwich panel so that the branch portions that extend on either side of the slot of said branch are driven respectively into the fourth and sixth layers, or respectively into the second and fourth layers, sandwiching respectively the third or the fifth electrically conductive layer, said respective third or fifth electrically conductive layer being engaged in the slot and being in electrical contact with the edges of the corresponding slot.

According to an advantageous characteristic of the invention, the density of the material of the second, fourth, and sixth layers is less than 300 kilograms per cubic meter ($kg/m^3$).

The invention also provides a connector suitable for connecting one of the electrically conductive layers of an electrically conductive sandwich panel to a power supply terminal, the connector presenting a U-shape, the free end of each branch being pointed and each branch of the U-shape being split longitudinally from its free end to the connection zone between said branch and the end wall of the U-shape.

According to an advantageous characteristic of the invention, the branches and the end wall of the U-shape forming each connector are flat.

According to an advantageous characteristic of the invention, said sandwich panel is further fitted with means for fastening said sandwich panel on a support, said fastener means comprising a drywall screw that presents a screw head and a metal shank comprising both a threaded end portion and also a smooth portion between said head and the threaded end portion, said smooth portion presenting an electrically insulating coating, e.g. of Teflon or epoxy, preferably of color that is different to the color of the screw shank that is coated therewith.

The invention also relates to a drywall screw for fastening an electrically conductive sandwich panel, said screw presenting a screw head and a metal shank comprising both a threaded end portion and also a smooth portion between said head and the threaded end portion, said smooth portion presenting an electrically insulating coating, e.g. of Teflon or epoxy, preferably of color that is different to that of the screw shank that is coated therewith.

According to an advantageous characteristic of the invention, the screw presents a diameter that is less than the thickness of the fourth layer, i.e. of the layer interposed between the two power supply tracks formed by the third and fifth layers.

According to an advantageous characteristic of the invention, said smooth portion is of length that is suitable for passing through the electrically conductive layers, while leaving a portion of the thread of the screw engaged in the sixth layer in order to hold the sandwich panel bearing against the support in which the screw is engaged.

The invention provides an assembly comprising a sandwich panel, at least one electrical device, which has one or two connection pins designed to be pushed into the sandwich panel, and a punch tool comprising a grip body designed to be gripped by the hand of an operator, and one or two punches of the same length that are pointed at their free ends and of elongate shape.

According to an advantageous characteristic of the invention, the diameter of the punches is greater than or equal to the diameter of the pin(s) of the electrical device.

BRIEF DESCRIPTION OF THE DRAWINGS

Other characteristics and advantages of the invention can be better seen on reading the following description, which is purely illustrative and non-limiting and should be read with reference to the accompanying drawings, in which.

DETAILED DESCRIPTION

Figure 1:
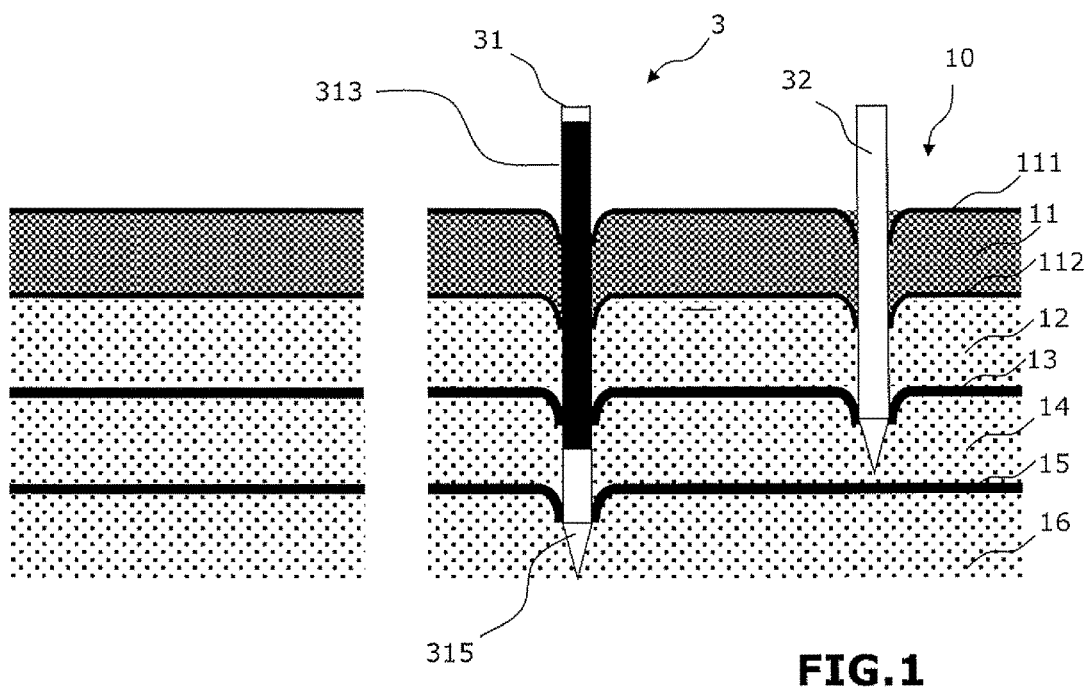
FIG. 1 is a section view of a sandwich panel and of two pins of different lengths of an electrical device pushed into said panel, in an embodiment of the invention.

With reference to the figures and as mentioned above, the invention relates to an electrically conductive sandwich panel 10 to which electrical devices are designed to be electrically connected. The term "electrical device" refers to any device or appliance designed to be powered electrically, such as a lighting device, a power outlet, or a sensor.

The sandwich panel 10 comprises a first layer 11 formed of a board that comprises two sheets 111, 112 of cardboard enclosing an electrically insulating material, such as plaster.

In a variant, the material of said board may be cement or another material. Said panel also comprises a sixth layer 16 of electrically insulating material, a second layer 12 of electrically insulating material, a third layer 13 of electrically conductive material, a fourth layer 14 of electrically insulating material, and a fifth layer 15 of electrically conductive material.

Other layers may be added and/or interposed between said layers.

The electrically insulating material used for making the layers 12, 14, and 16 is a material that does not deform conically when it is pierced, unlike a sheet of cardboard for example. Said material may be a polyurethane or polystyrene foam. The material may also be of the wool type, e.g. glass wool or compressed rock wool. The material may also be fibrous, such as wood, in particular balsa wood, or it may be a foam made from wood. Said material may also be a textile.

Preferably, the material is a "soft" material of density that is less than 300 kg/m³. The use of such a material makes it easy, e.g. by hand, to drive each power connector into the edge faces of the layers 12 and 14 or into the edge faces of the layers 14 and 16 of the panel. In other words, such a choice of material makes it possible to push each connector laterally into the panel in the same manner as pushing in a drawing pin, without having to provide a specific gap within the panel and without risking damaging the connectors.

The two electrically conductive layers 13, 15 are suitable for forming the two power supply tracks of an electrical device that has two electrical contacts for its power supply, which tracks may be positive and negative or live and neutral. Both electrical contacts may be carried by a single pin 30 (FIG. 2) or distributed over two pins 31, 32 (FIG. 1). As described below, the or each pin is designed to be pushed into the panel 10 in order to position one of the electrical contacts against the electrically conductive layer 13, and the other against the electrically conductive layer 15.

Provision may also be made for the panel to include at least one additional electrically conductive layer, which may be used to transmit a signal or may be connected to ground.

The tracks are designed to be connected via connectors 2 (described below) to a power supply, preferably an extra-low voltage (ELV) or a separated or safety extra-low voltage (SELV) mains power supply, e.g. a 12 volt (V) power supply. The DC SELV power supply can be implemented by using a transformer connected to ELV mains.

The thickness of the electrically conductive layers 13 and 15 is less than the thickness of the other layers. The electrically conductive layers present in particular a thickness that is less than 300 micrometers (µm), and preferably present a thickness of the order of 100 µm to 200 µm.

Said layers of the panel are bonded together adhesively. In particular, the layers 13 and 14, and 15 and 16 are bonded together adhesively by depositing lines of adhesive with a regular quantity of adhesive along each line, in order to ensure that an electrical contact zone of a pin of the electrical device does not pass through a zone of extra thickness of adhesive, which would cause it to be electrically insulated from the electrically conductive layer with which said pin is to be in contact. Specifically, a zone of adhesive of excessive thickness could form an insulation cone between the corresponding electrically conductive layer and the pin.

Said lines of adhesive may be made in straight and/or parallel manner, e.g. in sinuous manner, without any points of inflection that could risk leading to greater local deposition of adhesive.

The adhesive bonding is preferably performed by a hot method of adhesive bonding under pressure, of the hot melt type, or by a cold method of the polyurethane type.

In an embodiment, the second layer 12 that isolates the board 11 from the electrically conductive layer 13 and spaces it apart therefrom presents a thickness that is less than the thickness of each of the other layers 14, 16.

In a particular aspect, the second layer 12 of electrically insulating material is of thickness that is at least equal to the diameter of the or each pin 30; 31, 32 of the electrical device 3 pushed into the panel so as to enable the sheet of cardboard 112, which is deformed conically by the pin passing through it, to be kept away from the electrically conductive layer 13.

Advantageously, each of the electrically conductive layers comprises two metal sheets, preferably made of aluminum, and a sheet of resilient material enclosed between said metal sheets. Thus, when an electrical device provided with one or two pins carrying the electrical contacts, is pushed into the panel from the board, each of the layers 13, 15 forms a resilient assembly urging the top sheet of aluminum against the pin that is passing therethrough and thus promotes electrical contact between the corresponding contact carried by the pin and said electrically conductive layer.

In an embodiment, an electrical device, preferably a lighting device 3, e.g. an LED lighting device, is pushed onto said sandwich panel 10. To this end, the electrical device has one connection pin 30 or two connection pins 31, 32 designed to be pushed into the panel 10. For a device having one pin, said pin carries two spaced-apart contacts 303, 305 that are insulated from each other. In the example shown in FIG. 2, the contacts 303, 305 are in axial alignment. Each contact 303, 305 is designed to engage against a respective one of the layers 13, 15 without touching the other layer 15, 13.

In the embodiment shown in FIG. 1 in which the electrical device used has two pins 31, 32, the first pin 31 comprises a conductive portion 315 suitable for coming into contact with the conductive layer 15 without being in electrical contact with the layer 13. The second pin 32 is suitable for coming into contact with the conductive layer 13 without coming into electrical contact with the conductive layer 15.

The absence of electrical contact between a pin and a given conductive layer may be obtained by designing the length of the pin so that in the pushed-in state, it passes through the other conductive layer but without reaching said given conductive layer (see pin 32 of FIG. 1) or so that the portion of the pin that passes through said given conductive layer is electrically insulated (portion 313 of the pin 31 in FIG. 1 is insulated from the track 13).

The portion of a pin that is to be insulated is provided with a coating that can be formed by a paint or an insulating sheath, for example made of rigid material.

The sandwich panel 10 is further fitted with two connectors 2.

One of the connectors 2 is suitable for connecting one of the layers 13, 15 to one power supply terminal, and the other connector is suitable for connecting the other layer 13, 15 to the other power supply terminal.

Each connector 2 presents a U-shape. The free end of each branch 21, 22 is pointed, and each branch 21, 22 of the U-shape is slotted longitudinally from its free end to the connection zone between said branch 21, 22 and the end wall 20 of the U-shape.

Each layer 12, 14, and 16 presents a thickness that is thick enough for the branch of a connector to penetrate into the thickness of said layer.

Each connector may be fitted with an element forming an electrical connector for connecting an electric wire to the portion forming the end wall of the U-shape of the connector. The other end of the electric wire is connected to the power supply. In a variant, said electric wire may be soldered or crimped directly to the connector.

Each branch 21, 22 of the connector 2 is pushed into an edge face of the sandwich panel 10 so that the branch portions that extend on either side of the slot 210, 220 of said branch are driven respectively into the fourth and sixth layers 14, 16, or respectively into the second 12 and fourth 14 layers, sandwiching the third or the fifth electrically conductive layer 13, 15 that the operator wishes to connect via said power supply connector.

Each electrically conductive layer 13, 15 is engaged in the slots 210, 220 of the corresponding connector 2 and is in electrical contact with the edges of the corresponding slot.

Figure 4:
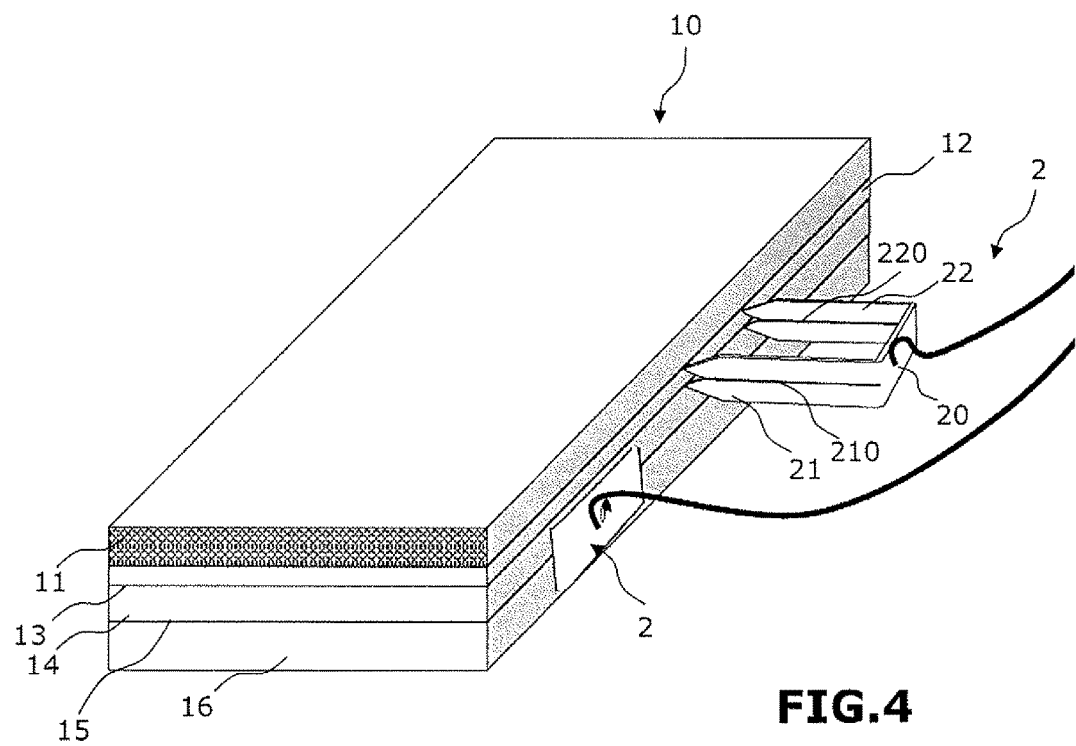
FIG. 4 is a view of FIG. 3 with the sandwich panel in the assembled state and one of the connectors in the inserted state in an edge face of the panel, across the corresponding electrically conductive layers.

The branches 21, 22 and the end wall 20 of the U-shape of each connector are flat so as to enable the U-shape to be driven in until it comes to bear on the edge face as shown in FIG. 4, and thus limit bulkiness of the panel.

Figure 5:
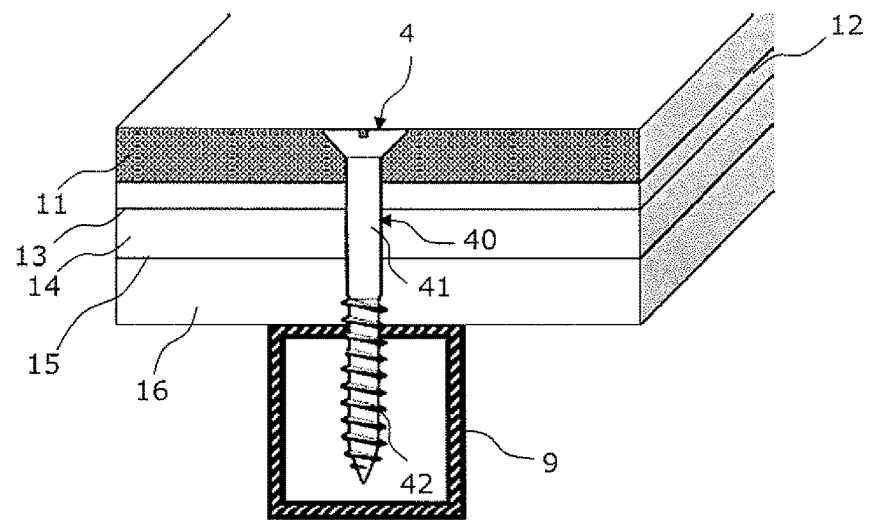
FIG. 5 is a perspective view of a sandwich panel and of a screw engaged in a track in an embodiment of the invention.

As shown in FIG. 5, said sandwich panel 10 may be fastened to a support 9, e.g. a metal track or a wooden support such as a joist, by means of a self-drilling "drywall" screw 4.

In an embodiment, said screw 4 presents a screw head and a metal shank 40 that comprise a threaded end portion 42, and between said head and the threaded end portion, a smooth portion 41. The metal shank 40 is preferably made of steel that has been subjected to a heat treatment in order to make it self-drilling.

Said smooth portion 41 presents an electrically insulating coating, e.g. of Teflon or epoxy, preferably of color that is different to the color of the screw shank 4 that is coated therewith. Preferably, said coating is presented in the form of a baked-on paint in order to avoid flaking of the coating. Selecting a white color enables scratches, if any, that could damage the electrical insulation of the smooth portion to be seen.

The screw 4 has a diameter that is less than the thickness of the fourth layer 14, thereby preventing the fifth layer 15 from coming into contact by conical deformation with the third layer 13 during screw-fastening.

Said insulated smooth portion 41 of the screw 4 is of length that is suitable for passing through the third and fifth electrically conductive layers 13, 15, while leaving a portion of the thread of the screw engaged in the sixth layer 16 in order to hold the sandwich panel 10 bearing against the support 9 in which the screw is engaged 4.

Figure 2:
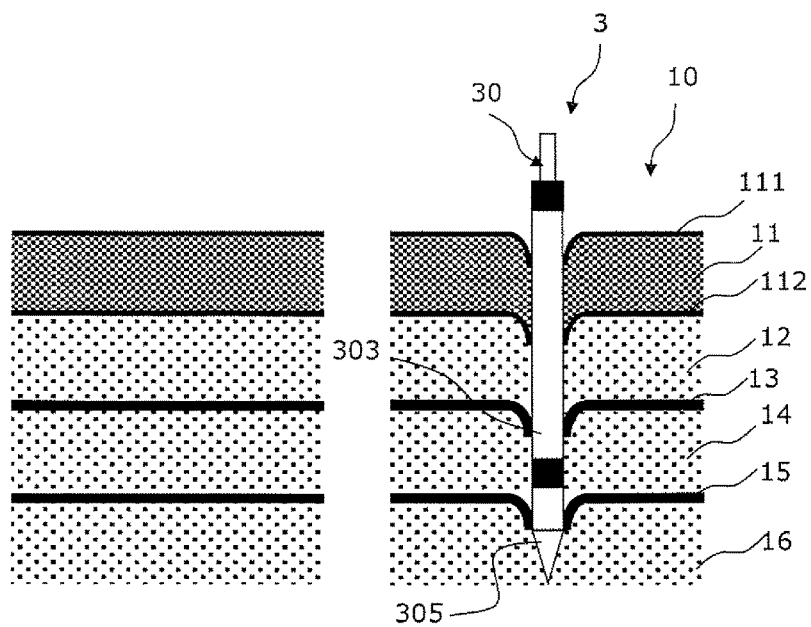
FIG. 2 is a view similar to that of FIG. 1 for an embodiment of the invention in which the electrical device has a single pin.
Figure 3:
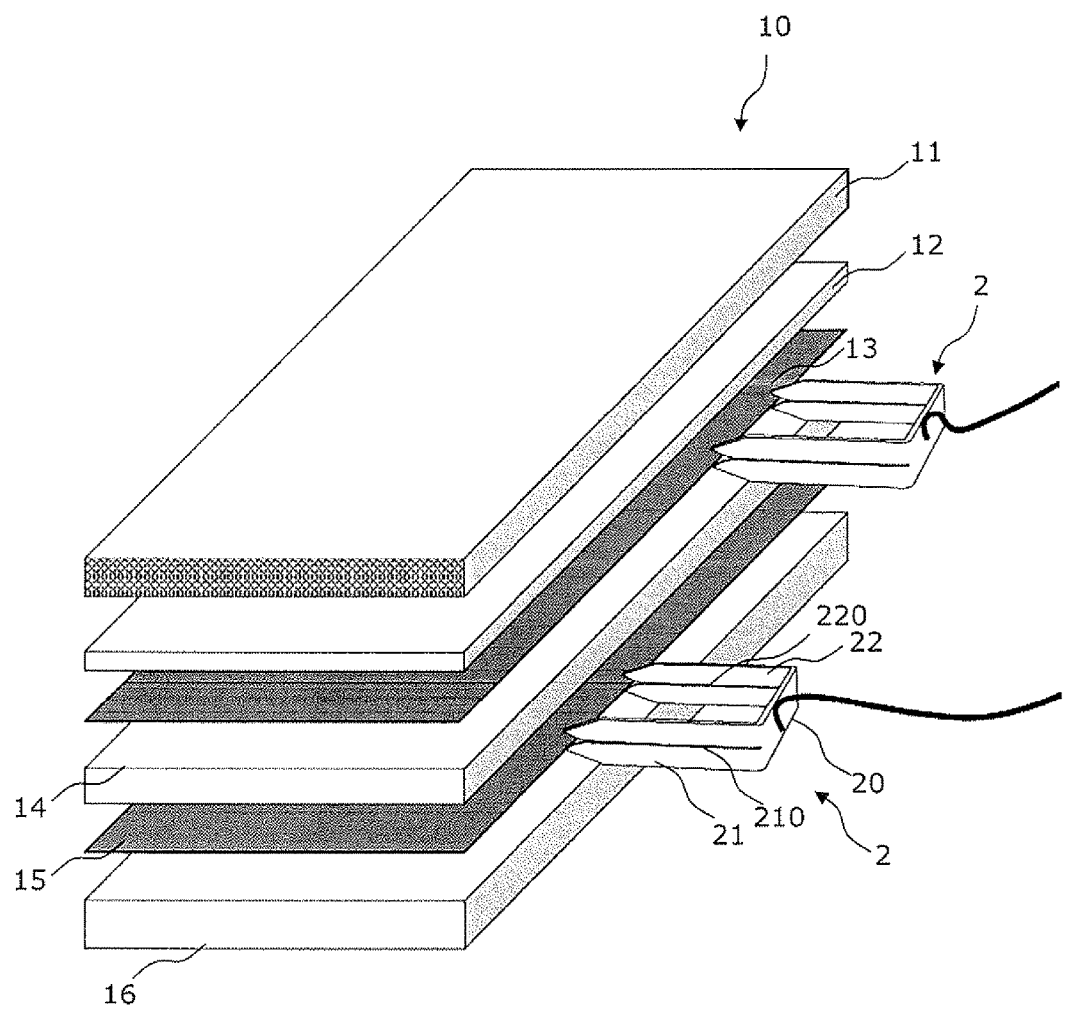
FIG. 3 is an exploded perspective view of a sandwich panel and of two U-shaped connectors showing the slots of the branches of the U-shape in an embodiment of the invention.
Figure 6:
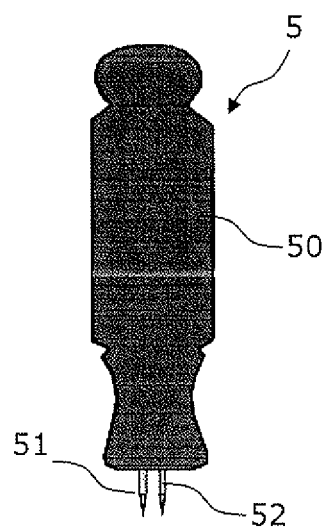
FIG. 6 is a side view of a punch tool in an embodiment of the invention.

In an embodiment, in order to facilitate pushing an electrical device into the sandwich panel, e.g. an electrical device having one or two connection pins, such as the device shown in FIG. 1 or 2, provision is made for a suitable punch tool 5 as shown in FIG. 6.

The punch tool 5 comprises a grip body 50 designed to be gripped by the hand of an operator, and one or two punches 51, 52 that are pointed at their free ends and of elongate shape. The length of each punch is suitable for passing through the thickness of the plasterboard, in particular the rigid material engaged between the sheets of cardboard. The grip body 50 is elongate and of generally cylindrical shape.

In an embodiment and for punch tools 5 having two punches 51, 52, said punches are of the same length and extend in parallel to each other from the face of the grip body designed to be directed towards the panel. The axis of the grip body is parallel to the axis of each punch.

Provision may be made for the diameter of the punches 51, 52 to be greater than or equal to the diameter of the pin(s) of the electrical device.

The punch tool may thus be used to make pilot holes in the panel from the board, after which the pin(s) of the electrical device are pushed into the panel, which is particularly advantageous when the two pins are not of the same length. Inserting such an electrical device without pilot holes risks bending the pins.

The invention is not limited to the embodiments shown in the drawings. Consequently, it should be understood that, when the characteristics mentioned in the accompanying claims are followed by references, the references are included solely for improving clarity of the claims and in no way limit the scope of the claims.

In addition, the term "comprising" does not exclude other elements of steps. Furthermore, characteristics or steps described with reference to one of the above-described embodiments may also be used in combination with other characteristics or steps of other above-described embodiments.

The invention claimed is:

1. An electrically conductive sandwich panel, wherein said sandwich panel comprises in the following order:
    a first layer formed of a board that comprises two sheets of cardboard enclosing an electrically insulating material;
    a second layer of electrically insulating material;
    a third layer of electrically conductive material;
    a fourth layer of electrically insulating material;
    a fifth layer of electrically conductive material; and
    a sixth layer of electrically insulating material.

2. A sandwich panel according to claim 1, wherein the second and third layers, as well as the fourth and fifth layers, are bonded together adhesively by depositing lines of adhesive with a regular quantity of adhesive along each line.

3. A sandwich panel according to claim 1, wherein at least one of the electrically conductive layers comprises two metal sheets, and a sheet of elastic material enclosed between said metal sheets.

4. A sandwich panel in accordance with claim 1, wherein said sandwich panel is further fitted with at least one electrical device which has one or two connection pins designed to be pushed into the panel and carrying two electrical contacts, the two electrical contacts being distributed on the or each of said pins in such a manner that, when the pin(s) is/are pushed into the panel, one of the electrical contacts touches one of the electrically conductive layers, without touching the other layer, which is touched by the other electrical contact.

5. A sandwich panel according to claim 4, wherein the second layer of electrically insulating material is of thickness that is at least equal to the diameter of the or each pin of the electrical device pushed into the panel.

6. A sandwich panel in accordance with claim 1, characterized in that said sandwich panel is further fitted with two connectors, one of the connectors being suitable for connecting one of the electrically conductive layers to one terminal of a power supply, and the other connector being suitable for connecting the other electrically conductive layer to the other terminal of the power supply; and
    in that each connector presents a U-shape, the free end of each branch being pointed and each branch of the U-shape being slotted longitudinally from its free end to the connection zone between said branch and the end wall of the U-shape.

7. A sandwich panel according to claim 6, wherein each branch of the connector is pushed into an edge face of the sandwich panel so that the branch portions that extend on either side of the slot of said branch are driven respectively into the fourth and sixth layers, or respectively into the second and fourth layers, sandwiching the third or the fifth electrically conductive layer, said third or fifth electrically conductive layer being engaged in the slot and being in electrical contact with the edges of the corresponding slot.

8. A sandwich panel according to claim 7, wherein the density of the material of the second, fourth, and sixth layers is less than 300 kg/m$^3$.

9. A sandwich panel according to claim 8, wherein the branches and the end wall of the U-shape forming each connector are flat.

10. A sandwich panel in accordance with claim 1, wherein said sandwich panel is further fitted with means for fastening said sandwich panel on a support, said fastener means comprising a drywall screw that presents a screw head and a metal shank comprising both a threaded end portion and also a smooth portion between said head and the threaded end portion, said smooth portion presenting an electrically insulating coating, preferably of color that is different to the color of the screw shank that is coated therewith.

11. A sandwich panel according to claim 10, wherein the screw presents a diameter that is less than the thickness of the fourth layer.

12. A sandwich panel according to claim 10, wherein said smooth portion is of length that is suitable for passing through the electrically conductive layers, while leaving a portion of the thread of the screw engaged in the sixth layer in order to hold the sandwich panel bearing against the support in which the screw is engaged.

13. An assembly comprising:
   a sandwich panel in accordance with any preceding claim;
   at least one electrical device that has one or two connection pins designed to be pushed into the sandwich panel; and
   a punch tool comprising a grip body designed to be gripped by the hand of an operator, and one or two punches of the same length that are pointed at their free ends and of elongate shape.

14. An assembly according to claim 13, wherein the diameter of the punches is greater than or equal to the diameter of the pin(s) of the electrical device.

15. A sandwich panel in accordance with claim 1, wherein said electrically insulating material is plaster.

16. A sandwich panel in accordance with claim 1, wherein said at least one electrical device is a lighting device.

* * * * *